(12) United States Patent
Tazume et al.

(10) Patent No.: US 12,524,018 B2
(45) Date of Patent: Jan. 13, 2026

(54) INFORMATION PROCESSING SYSTEM, METHOD FOR SETTING RELEASE PLACE, AND NON-TRANSITORY COMPUTER READABLE MEMORY

(71) Applicant: Rakuten Group, Inc., Tokyo (JP)

(72) Inventors: Toshiaki Tazume, Tokyo (JP); Daiki Tanaka, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 246 days.

(21) Appl. No.: 18/079,637

(22) Filed: Dec. 12, 2022

(65) Prior Publication Data

US 2023/0205233 A1  Jun. 29, 2023

(30) Foreign Application Priority Data

Dec. 24, 2021 (JP) ................ 2021-210809

(51) Int. Cl.
| | |
|---|---|
| *G05D 1/10* | (2006.01) |
| *B64C 39/02* | (2023.01) |
| *B64D 1/02* | (2006.01) |
| *G05D 1/00* | (2024.01) |
| *G05D 1/06* | (2006.01) |
| *B64U 101/30* | (2023.01) |
| *B64U 101/64* | (2023.01) |

(52) U.S. Cl.
CPC .......... *G05D 1/106* (2019.05); *B64C 39/024* (2013.01); *B64D 1/02* (2013.01); *G05D 1/0038* (2013.01); *G05D 1/0676* (2013.01); *B64U 2101/30* (2023.01); *B64U 2101/64* (2023.01); *B64U 2201/20* (2023.01)

(58) Field of Classification Search
CPC .... G05D 1/106; G05D 1/0038; G05D 1/0676; B64C 39/024; B64D 1/02; B64U 2101/30; B64U 2101/64; B64U 2201/20; B64U 70/00
See application file for complete search history.

(56) References Cited

U.S. PATENT DOCUMENTS

| | | | |
|---|---|---|---|
| 9,174,733 B1* | 11/2015 | Burgess | B64D 1/12 |
| 9,573,684 B2* | 2/2017 | Kimchi | B64U 50/19 |
| 9,580,173 B1* | 2/2017 | Burgess | G05D 1/102 |

(Continued)

FOREIGN PATENT DOCUMENTS

| | | |
|---|---|---|
| JP | 6527299 B1 | 6/2019 |
| JP | 2020-57225 A | 4/2020 |

(Continued)

*Primary Examiner* — Peter D Nolan
*Assistant Examiner* — Demetra R Smith-Stewart
(74) *Attorney, Agent, or Firm* — Sughrue Mion, PLLC

(57) ABSTRACT

The article transportation system S acquires first sensing information obtained by sensing a peripheral area around a user including a release candidate place with an optical sensor 23 of a user terminal 2 and the position information of the user terminal 2. Then, the article transportation system S determines whether the release candidate place satisfies one or more application conditions on the basis of the first sensing information, and in a case where it is determined that the release candidate place satisfies the one or more application conditions, sets a release place suitable for releasing an article from an UAV 1 on the basis of the release candidate place and the position information of the user terminal 2.

13 Claims, 10 Drawing Sheets

(56) References Cited

U.S. PATENT DOCUMENTS

| | | | |
|---|---|---|---|
| 9,817,396 B1* | 11/2017 | Takayama | G08G 5/26 |
| 9,969,494 B1* | 5/2018 | Buchmueller | B64U 10/13 |
| 10,893,107 B1* | 1/2021 | Callari | G06F 18/2115 |
| 10,922,984 B1 | 2/2021 | Boyd et al. | |
| 2016/0068264 A1* | 3/2016 | Ganesh | G08G 5/55 |
| | | | 701/4 |
| 2018/0043887 A1* | 2/2018 | Newman | B60W 10/04 |
| 2019/0012640 A1 | 1/2019 | Ferguson et al. | |
| 2019/0041852 A1 | 2/2019 | Schubert et al. | |
| 2020/0207474 A1* | 7/2020 | Foggia | G05D 1/0676 |
| 2021/0056713 A1* | 2/2021 | Rangesh | G01S 17/89 |
| 2021/0208603 A1 | 7/2021 | Tazume et al. | |
| 2022/0197306 A1* | 6/2022 | Cella | G06N 3/088 |
| 2022/0309932 A1* | 9/2022 | Pokorny | G05D 1/0011 |

FOREIGN PATENT DOCUMENTS

| | | |
|---|---|---|
| JP | 6829513 B1 | 2/2021 |
| KR | 10-2016-0020454 A | 2/2016 |
| WO | 2021/210138 A1 | 10/2021 |

\* cited by examiner

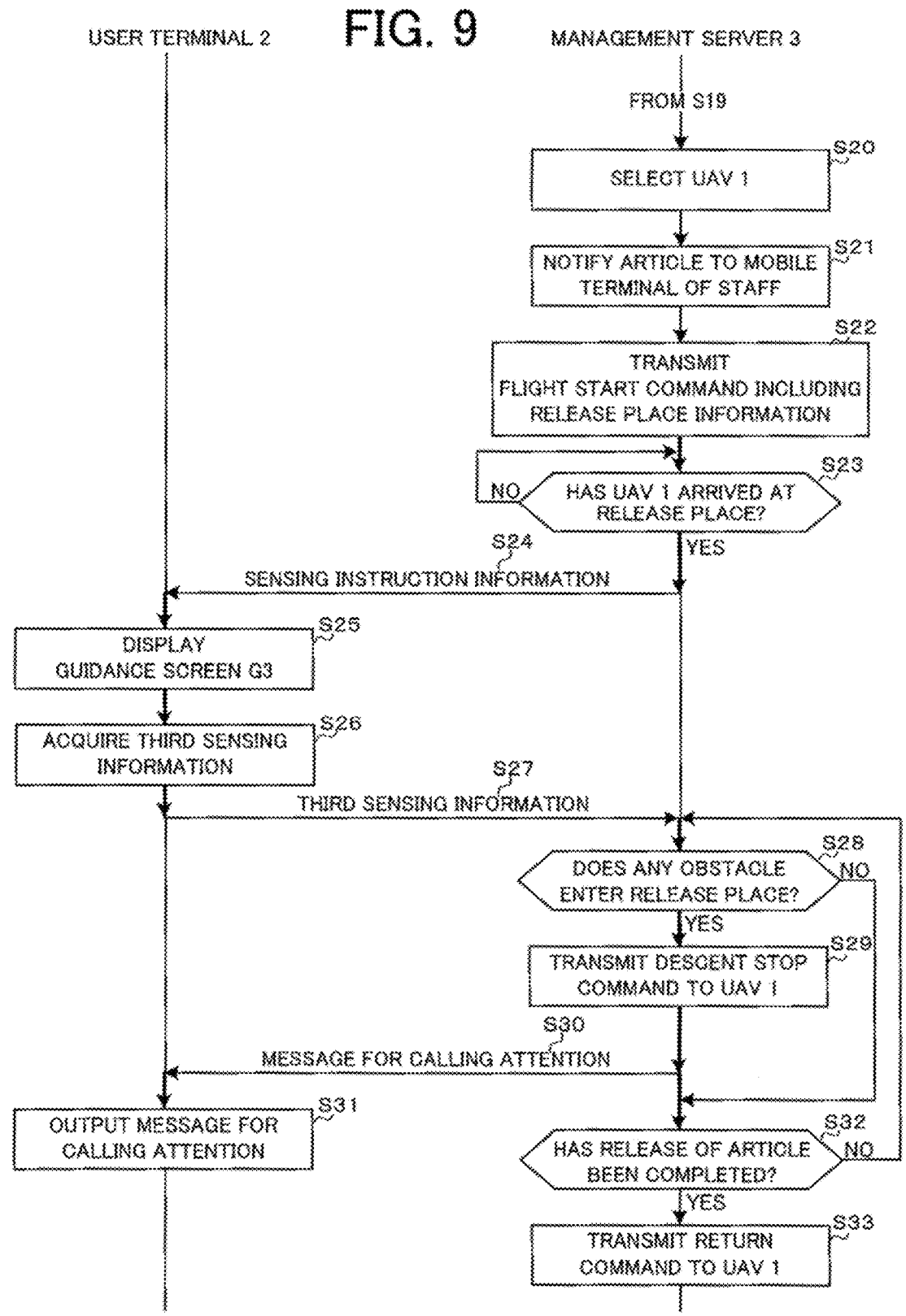

INFORMATION PROCESSING SYSTEM, METHOD FOR SETTING RELEASE PLACE, AND NON-TRANSITORY COMPUTER READABLE MEMORY

CROSS REFERENCE TO RELATED APPLICATION

This application claims priority from Japanese Patent Application No. 2021-210809 which was filed on Dec. 24, 2021, the disclosure of which is herein incorporated by reference in its entirety.

TECHNICAL FIELD

One or more embodiments of the present invention relates to a technical field such as a system that sets a place for releasing an article to be transported by an unmanned aerial vehicle on a ground.

RELATED ART

Conventionally, a technique related to a take-off/landing facility for appropriately landing an unmanned aerial vehicle is known. For example, the take-off and landing facility disclosed in WO 2021/210138 A includes a fence that defines a take-off/landing place of the unmanned aerial vehicle, a sensor provided on the fence to detect a horizontal position and an altitude of the unmanned aerial vehicle, and a communication unit that transmits position information indicating the horizontal position and the altitude of the unmanned aerial vehicle to the unmanned aerial vehicle, thereby enabling the unmanned aerial vehicle to be appropriately landed.

However, for example, in a case where an unmanned aerial vehicle transports articles such as relief supplies to an evacuation area at the time of disaster, it is difficult to secure a place ensuring safety such as a take-off/landing facility on the ground in advance as a release place (for example, a place where the unmanned aerial vehicle lands) at which the unmanned aerial vehicle releases the articles. On the other hand, a method is also conceivable in which a predetermined information processing device selects a candidate area having a certain range from map information, causes an unmanned aerial vehicle to fly over the candidate area, and causes a sensor of the unmanned aerial vehicle to sense a lower side from the sky, thereby searching for a release place (for example, a place suitable for landing of an unmanned aerial vehicle) suitable for releasing the articles. However, in this case, since there may be a case where such a place does not exist in the candidate area, there is a possibility that the search using the unmanned aerial vehicle may be futile. Even if there is a release place suitable for releasing the articles from the unmanned aerial vehicle in the candidate area, there is a limit to a method in which the unmanned aerial vehicle performs sensing from the sky while flying at a predetermined speed, and there is a possibility that such a place may not be found.

Therefore, one or more embodiments of the present invention are to providing an information processing system, a method for setting a release place, and a program that are capable of more efficiently setting a release place suitable for unmanned aerial vehicle to release a article.

SUMMARY

In response to the above issue, an information processing system includes at least one memory configured to store program code; and at least one processor configured to access the program code and operate as instructed by the program code. The program code includes: acquisition code configured to cause the at least one processor to acquire, together with position information of a terminal of a user on a ground, first sensing information obtained by sensing a peripheral area around the user including a release candidate place at which an article to be transported by an unmanned aerial vehicle is to be released, the sensing being performed by a sensor provided in the terminal; first determination code configured to cause the at least one processor to determine whether the release candidate place satisfies one or more a predetermined application conditions as a place at which the article is able to be released on the basis of the first sensing information; and setting code configured to cause the at least one processor to set a release place suitable for releasing the article from the unmanned aerial vehicle on the basis of the release candidate place and the position information of the terminal in a case where it is determined that the release candidate place satisfies the one or more application conditions.

The program code may further include first control code configured to cause the at least one processor to make the unmanned aerial vehicle start a flight toward the release place after the release place has been set.

The one or more application conditions may include that there is no obstacle in the release candidate place and that the release candidate place has a ground area of a predetermined size or more.

The one or more application conditions may include that there is no obstacle in the release candidate place and that the release candidate place has a flat ground area of a predetermined size or more.

The acquisition code may cause the at least one processor to further acquire, before the release place is set and in response to an operation of the user, second sensing information obtained by the sensor sensing above the release candidate place. The first determination code may cause the at least one processor to further determine whether there is an obstacle above the release candidate place on the basis of the second sensing information. The setting code may cause the at least one processor to set the release place in a case where it is determined that there is no obstacle above the release candidate place.

The program code may further include instruction code configured to cause the at least one processor to instruct the user to perform sensing above the release candidate place before the release place is set in a case where it is determined that the release candidate place satisfies the one or more application conditions. The acquisition code may cause the at least one processor to acquire second sensing information obtained by sensing above the release candidate place with the sensor in response to the operation of the user after the instruction is given to the user.

The acquisition code may cause the at least one processor to further acquire third sensing information obtained by sensing a peripheral area including the release place with the sensor when the unmanned aerial vehicle descends to release the article at the release place. The program code may further include second determination code configured to cause the at least one processor to determine whether an obstacle has entered or will enter the release place on the basis of the third sensing information.

The second determination code may cause the at least one processor to determine whether the obstacle has entered or will enter the release place by comparing images included in the first sensing information and the third sensing information.

The program code may further include second control code configured to cause the at least one processor to make the unmanned aerial vehicle stop descent at the release place in a case where it is determined that the obstacle has entered or will enter the release place.

The program code may further include processing code configured to cause the at least one processor to perform processing for issuing an alert at the release place in a case where it is determined that an obstacle has entered or will enter the release place.

The program code may further include reception code configured to cause the at least one processor to receive a request to transport of the article to the release place, the article being designated by the user.

The program code may further include presentation code configured to cause the at least one processor to present to the user, before the user designates the article, information of the article that has already been requested to be transported to a specific area including the release place.

The acquisition code may cause the at least one processor to acquire direction information indicating a direction of the sensor at the time of the sensing, and the setting code may cause the at least one processor to set the release place on the basis of the release candidate place, position information of the terminal, and the direction information.

A method for setting release place to be executed by one or more computers, includes: acquiring, together with position information of a terminal of a user on a ground, first sensing information obtained by sensing a peripheral area around the user including a release candidate place at which an article to be transported by an unmanned aerial vehicle is to be released, the sensing being performed by a sensor provided in the terminal; determining whether the release candidate place satisfies one or more predetermined application conditions as a place at which the article is able to be released on the basis of the first sensing information; and setting a release place suitable for releasing the article from the unmanned aerial vehicle on the basis of the release candidate place and the position information of the terminal in a case where it is determined that the release candidate place satisfies the one or more application conditions.

A non-transitory computer readable memory has stored thereon a program configured to cause a computer included in a terminal of a user on a ground to: acquire, together with position information of the terminal, first sensing information obtained by sensing a peripheral area around the user including a release candidate place at which an article to be transported by an unmanned aerial vehicle is to be released, the sensing being performed by a sensor provided in the terminal and the release candidate place existing around the user; determine whether the release candidate place satisfies one or more predetermined application conditions as a place at which the article is able to be released on the basis of the first sensing information; and set a release place suitable for releasing the article from the unmanned aerial vehicle on the basis of the release candidate place and the position information of the terminal in a case where it is determined that the release candidate place satisfies the one or more application conditions.

BRIEF DESCRIPTION OF THE DRAWINGS

FIG. 9 is a sequence diagram illustrating an example of an operation of the article transportation system S when transportation of the article is performed.

DETAILED DESCRIPTION

Hereinafter, one or more embodiments of the present invention will be described with reference to the drawings. Incidentally, the following embodiment is an embodiment when the present invention is applied to an article transportation system.

[1. Configuration of Article Transportation System S]

Figure 1:
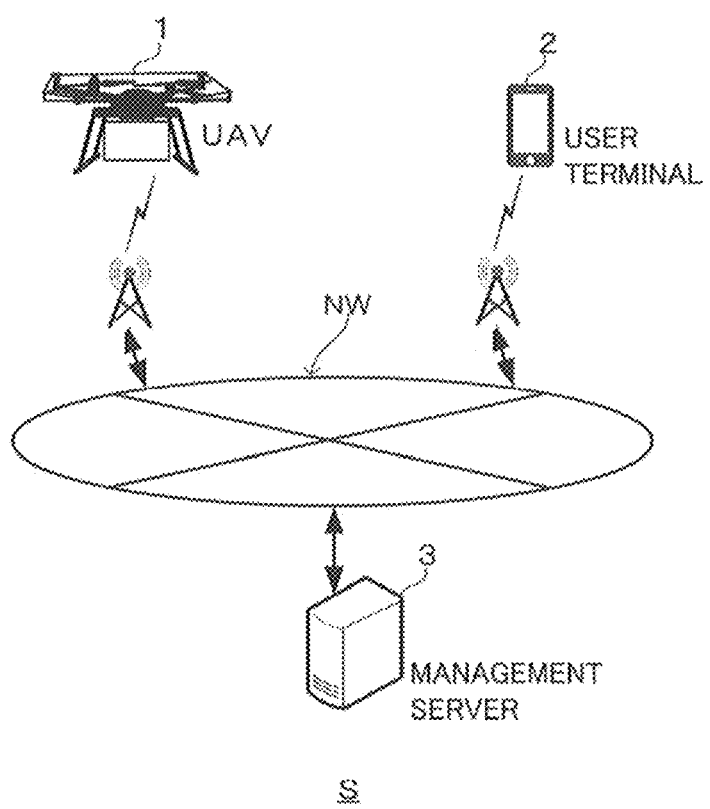
FIG. 1 is a diagram illustrating a schematic configuration example of an article transportation system S.

First, a configuration of an article transportation system S according to an embodiment of the present invention will be described with reference to FIG. 1. FIG. 1 is a diagram illustrating a schematic configuration example of the article transportation system S. As illustrated in FIG. 1, the article transportation system S includes an unmanned aerial vehicle (hereinafter, referred to as "UAV (Unmanned Aerial Vehicle)") 1, a user terminal 2, and a management server 3, which are connectable to the communication network NW. Here, the article transportation system S is an example of an information processing system, and the UAV is an example of an unmanned flying body. The communication network NW includes, for example, the Internet, a mobile communication network, a radio base station thereof, and the like.

The UAV 1 is also called a drone or a multi-copter, and is capable of flying from the ground according to remote control by an operator or autonomously flying in the air. The UAV 1 is used to transport one or more articles (for example, rescue supplies and relief supplies) to a specific area having no take-off/landing facility (also referred to as take-off/landing port) prepared in advance for the UAV 1 to take off and land, such as an evacuation area at the time of disaster. The user terminal 2 is a terminal used by a user such as a person in need of rescue (disaster-stricken person) or a rescuer on the ground in a specific area. Incidentally, in the present embodiment, the user on the ground means a user who is (for example, standing) in contact with the ground or a rooftop surface of a building. The management server 3 is used to search for a release place suitable for releasing the article from the UAV 1 in the specific area.

[1-1. Configuration and Function of UAV 1]

Figure 2:
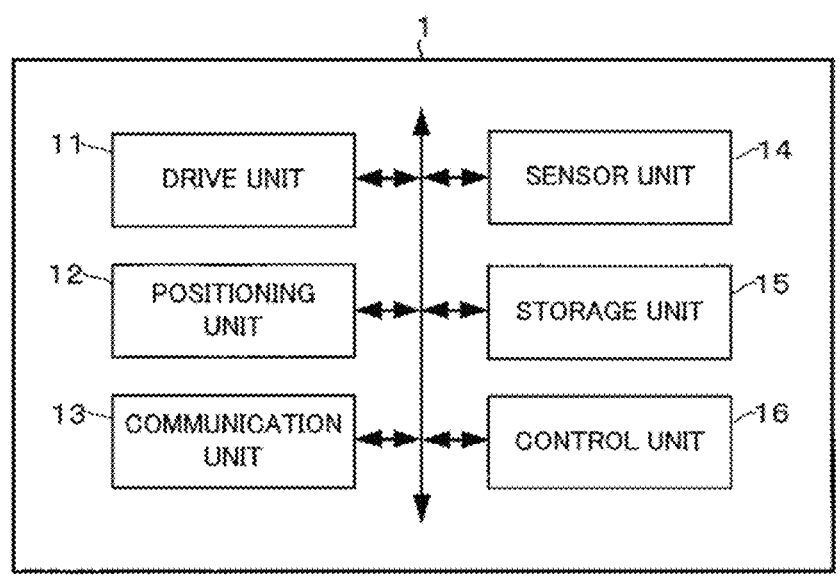
FIG. 2 is a diagram illustrating a schematic configuration example of an UAV 1.

Next, the configuration and function of the UAV 1 will be described with reference to FIG. 2. FIG. 2 is a diagram illustrating a schematic configuration example of the UAV 1. As illustrated in FIG. 2, the UAV 1 includes a drive unit 11, a positioning unit 12, a communication unit 13, a sensor unit 14, a storage unit 15, a control unit 16, and the like. Furthermore, the UAV 1 includes a battery (not illustrated) that supplies power to each unit of the UAV 1, a rotor (propeller) that is a horizontal rotary wing, a holding mechanism for holding the article to be transported, and the like. The holding mechanism may be provided with a storage portion for storing the article. In this case, an opening/closing door is provided on a side surface or a lower surface of the storage portion. Incidentally, the holding mechanism may include a wire and a reel (winch) for feeding or winding the wire.

The drive unit 11 includes a motor, a rotation shaft, and the like. The drive unit 11 rotates a plurality of rotors by the motor, the rotation shaft, and the like that are driven in accordance with a control signal output from the control unit 16. The positioning unit 12 includes a radio wave receiver, an altitude sensor, and the like. The positioning unit 12 receives, for example, a radio wave transmitted from a GNSS (global navigation satellite system) satellite by a radio receiver, and detects the current position (latitude and longitude) of the UAV 1 in the horizontal direction on the basis of the radio wave. The current position of the UAV 1 in the horizontal direction may be corrected on the basis of an image captured by a camera of the sensor unit 14. The position information indicating the current position detected by the positioning unit 12 is output to the control unit 16. Furthermore, the positioning unit 12 may detect the current position (altitude) of the UAV 1 in the vertical direction by the altitude sensor such as an atmospheric pressure sensor. In this case, the position information includes altitude information indicating the altitude of the UAV 1.

The communication unit 13 has a wireless communication function and is responsible for controlling communication performed via the communication network NW. The sensor unit 14 includes various sensors used for flight control of the UAV 1. Examples of the various sensors include an optical sensor, a distance sensor, a triaxial angular velocity sensor, a triaxial acceleration sensor, and a geomagnetic sensor, and the like. The optical sensor includes, for example, a camera, and continuously senses (for example, images) a real space within a range that falls within an angle of view of the camera. Sensing information (for example, an image) obtained by sensing with the sensor unit 14 is output to the control unit 16. The storage unit 15 includes a nonvolatile memory or the like, and stores various programs and data. Moreover, the storage unit 15 stores a vehicle ID (identification information) for identifying the UAV 1.

The control unit 16 includes at least one CPU (Central Processing Unit), a ROM (Read Only Memory), and a RAM (Random Access Memory), and executes various controls according to a program stored in the ROM (or the storage unit 15). For example, the control unit 16 performs flight control to cause the UAV 1 to fly toward the release place set in the specific area. In this flight control, the rotation speed of the rotor, and the position, the attitude, and the traveling direction of the UAV 1 are controlled using the position information acquired from the positioning unit 12, the sensing information acquired from the sensor unit 14, the release place information, and the like. As a result, the UAV 1 can autonomously move to the release place. The release place information indicates a planar size (width) and a position (latitude and longitude) of the release place. The release place information may be set at the departure point (flight start point) in the UAV 1, or may be set by being transmitted from the management server 3. Incidentally, during the flight of the UAV 1, the position information of the UAV 1 and the vehicle ID of the UAV 1 are sequentially transmitted to the management server 3 by the communication unit 13.

Moreover, the control unit 16 performs release control for releasing the article from the UAV 1 in a state in which the UAV 1 lands (landing state) in the release place or in a state in which the UAV 1 hovers (hovering state). The state of hovering in the release place refers to, for example, a state in which the UAV 1 is stopped at a position (in the air) separated from the ground or the rooftop surface of the building in the release place by several tens of centimeters to several meters in the vertical direction. By the release control of the control unit 16, the article is released by being separated from the holding mechanism of the UAV 1, or the article is released by opening the opening/closing door of the storage portion of the holding mechanism. Such release also includes a case where the article is taken out from the storage portion by the user. Incidentally, By feeding the wire by the reel of the UAV 1, the article may be released when the article or the storage portion thereof are lowered in the vertical direction and arrive on the ground or the rooftop surface of the building.

[1-2. Configuration and Function of User Terminal 2]

Figure 3:
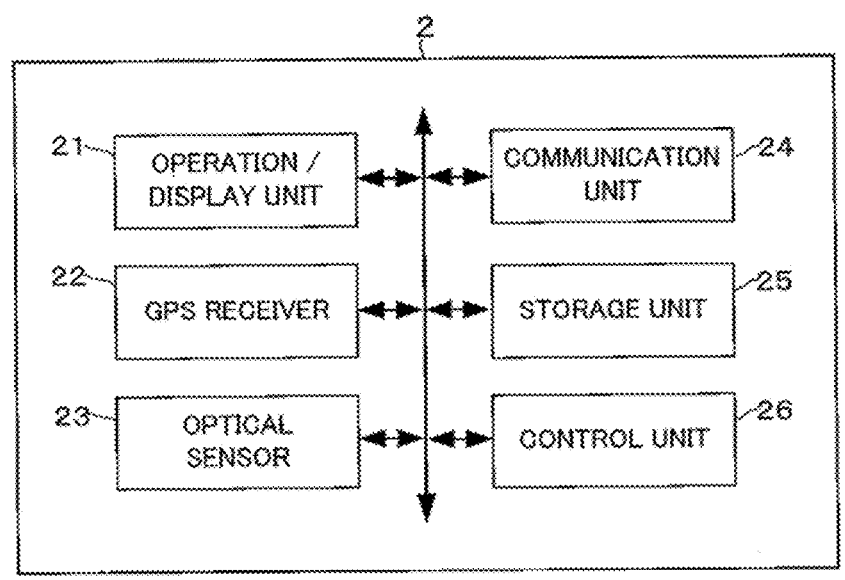
FIG. 3 is a diagram illustrating a schematic configuration example of a user terminal 2.

Next, the configuration and function of the user terminal 2 will be described with reference to FIG. 3. FIG. 3 is a diagram illustrating a schematic configuration example of the user terminal 2. The user terminal 2 includes an operation/display unit 21, a GPS (global positioning system) receiver 22, an optical sensor 23, a communication unit 24, a storage unit 25, a control unit 26, and the like. Incidentally, as the user terminal 2, for example, a smartphone, a tablet, or the like can be applied. The user terminal 2 may include a voice processor and a speaker. The operation/display unit 21 has, for example, an input function of receiving an operation by a user's finger, a pen, or the like, and a display function of displaying various screens. The GPS receiver 22 receives a radio wave transmitted from a GPS satellite, and detects the current position (latitude and longitude) of the user terminal 2. The position information indicating the position detected by the GPS receiver 22 is output to the control unit 26.

The optical sensor 23 includes, for example, a camera, and senses (for example, images) a real space within a range that falls within an angle of view of the camera. Furthermore, the optical sensor 23 includes a LiDAR (Light Detection and Ranging, or Laser Imaging Detection and Ranging) sensor. The LiDAR sensor can identify the distance and shape to an object by emitting laser light and measuring the time until the laser light is reflected by the object. Since such laser light has a high light flux density and a short wavelength, the shape of the object is able to be identified with high accuracy by the LiDAR sensor. In the present embodiment, the optical sensor 23 is used to sense a peripheral area including a release candidate place that is a candidate for a release place. Here, the release candidate place exists around the user of the user terminal 2 (for example, a range of several meters to several tens of meters from the user). The peripheral area including the release candidate place means a release candidate place, and a peripheral area of the release candidate place. First sensing information obtained by sensing the peripheral area including the release candidate place existing around the user by the optical sensor 23 is output to the control unit 26.

Moreover, the optical sensor 23 is also used to sense above (upper aerial area) the release candidate place in order to determine the presence or absence of an obstacle above the release candidate place. Second sensing information obtained by sensing above the release candidate place by the optical sensor 23 is output to the control unit 26. Furthermore, the optical sensor 23 is also used to sense the peripheral area including the release place when the UAV 1 descends to release the article at the release place. Here, "when the UAV 1 descends" refers to immediately before the UAV 1 descends (that is, when the UAV 1 reaches the sky above the release place) or while the UAV 1 is descending. For example, the peripheral area including the release place means the release place, and a peripheral area of the release place. When the UAV 1 descends to release the article at the release place, third sensing information obtained by sensing the release place by the optical sensor 23 is output to the control unit 26.

The communication unit 24 has a wireless communication function and is responsible for controlling communication performed via the communication network NW. The storage unit 25 includes a nonvolatile memory or the like, and stores various programs and data. The various programs include an operating system (OS), a release place setting application (including the program of the present invention), and a browser. The release place setting application is an application for causing the user terminal 2 to sense a peripheral area including a release candidate place existing around the user and setting a release place. Incidentally, the release place setting application is downloaded from a predetermined server to the user terminal 2.

Figure 4:
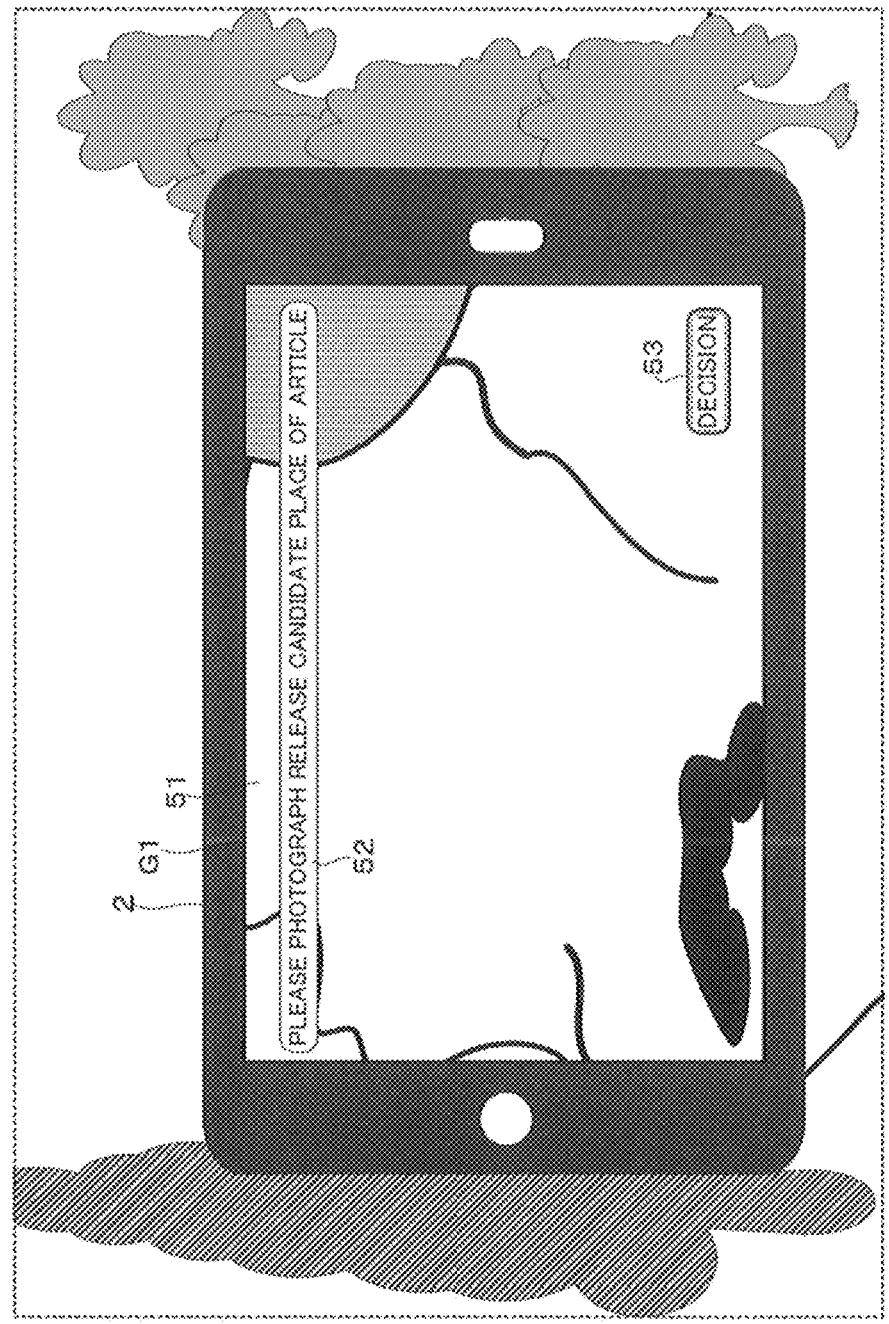
FIG. 4 is a diagram illustrating an example of a guidance screen G1 for sensing a peripheral area including a release candidate place existing around a user.

The control unit 26 includes at least one CPU, a ROM, a RAM, and the like, and executes processing according to a release place setting application stored in a ROM (or the storage unit 25). For example, the control unit 26 causes the operation/display unit 21 to display a guidance screen G1 for sensing a peripheral area including a release candidate place existing around the user. FIG. 4 is a diagram illustrating an example of a guidance screen G1 for sensing a peripheral area including a release candidate place existing around the user. On the guidance screen G1 illustrated in FIG. 4, a real-time real space image 51 from the optical sensor 23, a guidance message 52 of "PLEASE photograph RELEASE CANDIDATE PLACE OF ARTICLE", and a decision button 53 are displayed. In accordance with the guidance message 52, the user moves the user terminal 2 so that the release candidate place determined to be appropriate by the user himself/herself falls within the guidance screen G1 (that is, the real space image 51), and performs an operation of designating (for example, tapping on the guidance screen G1) the decision button 53. As a result, a sensing range of the optical sensor 23 is set.

Then, in response to the user's operation, the control unit 26 causes the optical sensor 23 to sense the peripheral area including the release candidate place that falls within the guidance screen G1, for example, acquires the first sensing information obtained by the sensing, and acquires position information (that is, the position information of the user terminal 2) indicating a position detected by the GPS receiver 22 at the sensing timing. The first sensing information and the position information thus acquired are transmitted to the management server 3 by the communication unit 24. Then, in a case where the management server 3 determines that the release candidate place satisfies one or more application conditions (requirements) on the basis of the first sensing information, the release place is set on the basis of the release candidate place and the position information of the user terminal 2. Incidentally, the control unit 26 acquires direction information indicating the direction (orientation) of the optical sensor 23 at the time of sensing. Here, the direction of the optical sensor 23 is, for example, the optical axis direction of the camera or the emission direction of the LiDAR sensor, and is represented by an azimuth. In this case, the direction information is transmitted to the management server 3 together with the first sensing information and the position information, and the release place is set on the basis of the release candidate place, the position information, and the direction information.

Figure 5:
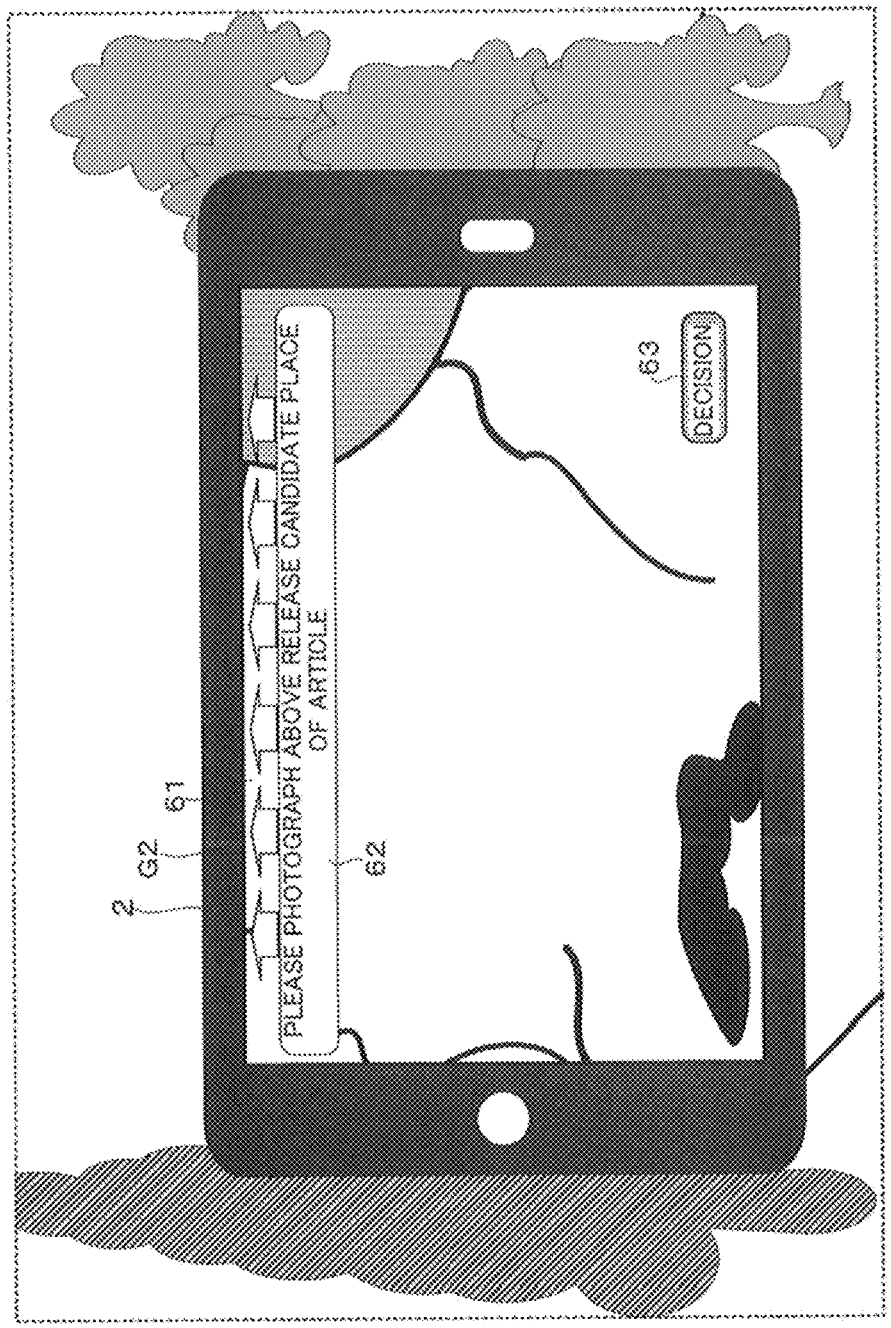
FIG. 5 is a diagram illustrating an example of a guidance screen G2 for sensing above the release candidate place.

Moreover, after acquiring the first sensing information, the control unit 26 may cause the operation/display unit 21 to display a guidance screen G2 for sensing above the release candidate place. FIG. 5 is a diagram illustrating an example of the guidance screen G2 for sensing above the release candidate place. On the guidance screen G2 illustrated in FIG. 5, a real-time real space image 61 from the optical sensor 23, a guidance message 62 of "PLEASE PHOTOGRAPH ABOVE RELEASE CANDIDATE PLACE OF ARTICLE", and a decision button 63 are displayed. In accordance with the guidance message 62, the user moves the user terminal 2 so that the area above the release candidate place falls within the guidance screen G2 (that is, the real space image 61), and performs an operation of designating the decision button 63. As a result, a sensing range of the optical sensor 23 is set. Incidentally, after it is determined that the release candidate place satisfies the one or more application conditions, the guidance screen G2 is displayed according to the sensing instruction information transmitted from the management server 3 before the release place is set. Such sensing instruction information is information for instructing sensing above the release candidate place.

Then, in response to the user's operation, the control unit 26 causes the optical sensor 23 to sense above the release candidate place that falls within the guidance screen G2, for example, and acquires the second sensing information obtained by the sensing. The second sensing information thus acquired is transmitted to the management server 3 by the communication unit 24. Then, in a case where the management server 3 determines that the release candidate place satisfies the one or more application conditions, and determines that there is no obstacle above the release candidate place on the basis of the second sensing information, the release place is set.

When the release place existing around the user is set, it is possible to accept a transport request for an article that the user wants to be supplied. As a result, the article desired by the user are able to be promptly transported to the release place by the UAV 1. For example, the control unit 26 displays an article designation screen for designating the names, the quantity, and the like of the article on the operation/display unit 21, and transmits a transport request of the article designated by the user on the article designation screen to the management server 3 via the communication unit 24. Here, before the user designates the article, the control unit 26 presents the article which have already been requested to be transported (for example, requested to be transported from a user terminal 2 of another user) to the specific area including the release place to the user. As a result, it is possible to minimize the same (that is, duplicated) article being requested to be transported to the same specific area.

Figure 6:
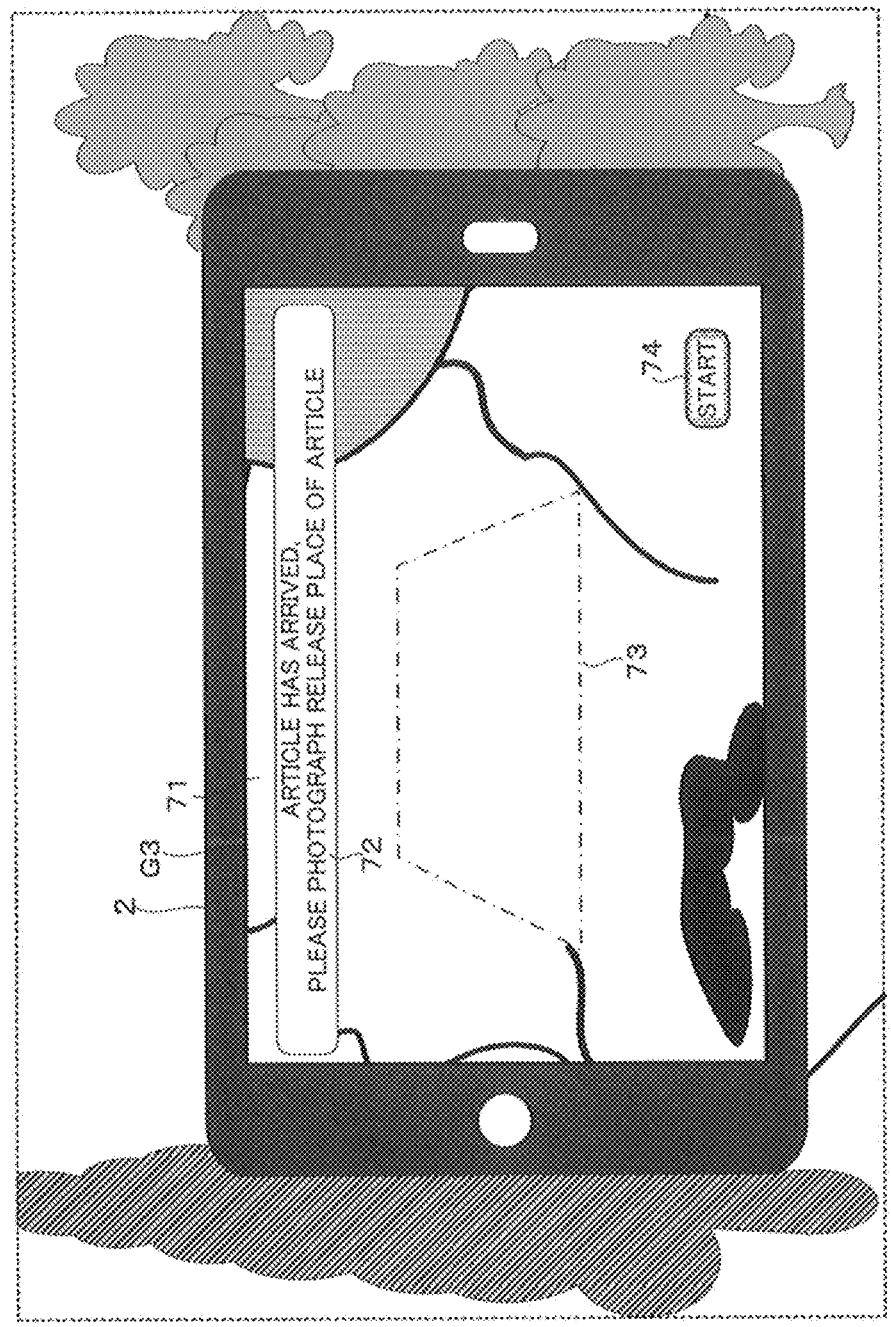
FIG. 6 is a diagram illustrating an example of a guidance screen G3 for sensing a peripheral area including a release place.

Furthermore, after the release place has been set, when the UAV 1 that transports the article arrives at the release place, the control unit 26 may display a guidance screen G3 for sensing the peripheral area including the release place on the operation/display unit 21. FIG. 6 is a diagram illustrating an example of the guidance screen G3 for sensing the peripheral area including the release place. On the guidance screen G3 illustrated in FIG. 6, a real-time real space image 71 from the optical sensor 23, a guidance message 72 of "ARTICLE HAS ARRIVED, PLEASE PHOTOGRAPH RELEASE PLACE OF ARTICLE", a release place frame 73 corresponding to the planar size of the release place, and a start button 74 are displayed. In accordance with the guidance message 72, the user moves the user terminal 2 so that the release candidate place determined to be appropriate by the user himself/herself substantially matches the release place frame 73 displayed on the guidance screen G3 (that is, the real space image 71), and performs an operation of designating the start button 74. As a result, the sensing range is set.

Then, in response to the user's operation, when the UAV 1 descends to release the article at the release place, the control unit 26 causes the optical sensor 23 to continuously sense the peripheral area including the release place, and acquires the third sensing information obtained by the sensing. The third sensing information thus acquired is transmitted to the management server 3 by the communication unit 24. Then, in a case where the management server 3 determines that an obstacle has entered or will enter the release place on the basis of the third sensing information, the control unit 26 performs an attention calling processing for calling attention to the user at the release place. In the attention calling processing, the control unit 26 causes the operation/display unit 21 to display a message for calling attention (i.e. issuing an alert) to the user at the release place. Moreover, the control unit 26 may cause a speaker to output, by voice, a message for calling attention to the user at the release place.

[1-3. Configuration and Function of Management Server 3]

Figure 7A:
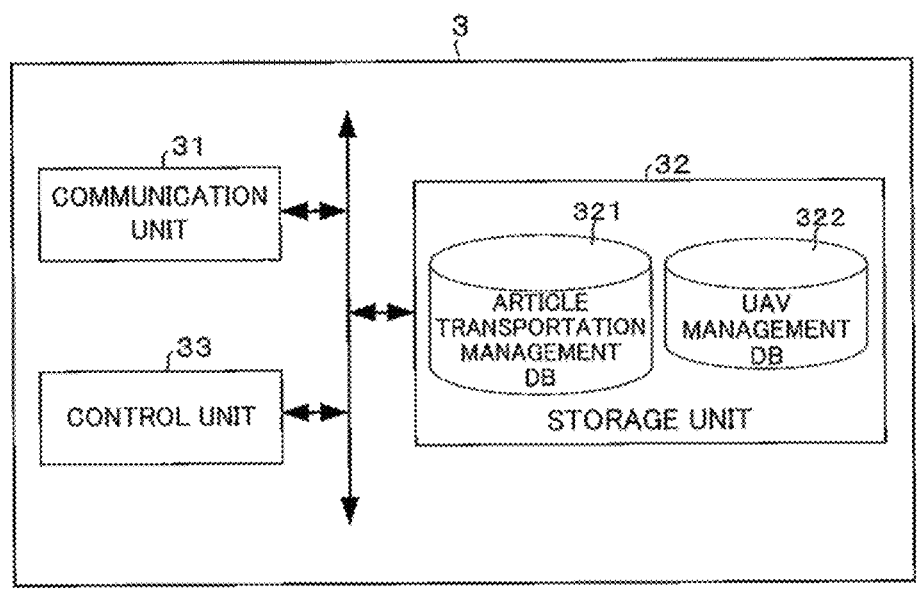
FIG. 7A is a diagram illustrating a schematic configuration example of a management server 3.

Next, the configuration and the function of the management server 3 will be described with reference to FIGS. 7A and 7B. FIG. 7A is a diagram illustrating a schematic configuration example of the management server 3. As illustrated in FIG. 7A, the management server 3 includes a communication unit 31, a storage unit 32, a control unit 33, and the like. The communication unit 31 is responsible for controlling communication performed via the communication network NW. The position information and the vehicle ID transmitted from the UAV 1 are received by the communication unit 31. The management server 3 can recognize the current position of the UAV 1 from the position information of the UAV 1. The storage unit 32 includes, for example, a hard disk drive or the like, and stores various programs and data. The programs may be stored in a non-transitory computer readable memory. Moreover, the storage unit 32 stores an article list related to transportable article. The article list includes, for example, an article ID (identification information) of each article, a name, a type, a size, and a photographic image of the article. In the storage unit 32, an article transportation management database 321, a UAV management database 322, and the like are constructed.

The article transportation management database 321 is a database for managing information related to transportation of the article. In the article transportation management database 321, position information indicating the position of the specific area, the article ID, the name, the quantity, the type, the size, the photographic image, transport date, and the like of the article transported to the specific area are stored (registered) in association with each specific area. Here, the position information indicating the position of the specific area includes, for example, the position (latitude and longitude) of each point included in the specific area.

The UAV management database 322 is a database for managing information related to the UAV 1. In the UAV management database 322, the vehicle ID of the UAV 1, the position information of the UAV 1, a vehicle size (body size) of the UAV 1, an operation (work) status of the UAV 1, access information to the UAV 1, and the like are stored (registered) in association with each UAV 1. Here, the vehicle size is, for example, the planar size of the UAV 1 (length ym×width xm). The operation status indicates, for example, whether the UAV 1 is in an operable state for transportation of the article. For example, the operable state means a state in which the charging of the battery of the UAV 1 is completed and the flight can be started. The access information to the UAV 1 is information (for example, an IP address or the like) for the center server 3 to access the UAV 1.

The control unit 33 includes at least one CPU, a ROM, a RAM, and the like. The CPU (an example of processor) is configured to access the program code stored in the storage unit 32 or the memory and operate as instructed by the program code. The program code includes: acquisition code configured to cause the CPU to acquire, together with position information of the user terminal 2 of the user on the ground, the first sensing information obtained by sensing the peripheral area including the release candidate place existing around the user with the optical sensor 23 provided in the user terminal 2; first determination code configured to cause the CPU to determine whether the release candidate place satisfies one or more predetermined application conditions as a place at which the article is able to be released on the basis of the first sensing information; and setting code configured to cause the CPU to set the release place suitable for releasing the article from the UAV 1 on the basis of the release candidate place and the position information of the user terminal 2 in a case where it is determined that the release candidate place satisfies the one or more predetermined application conditions.

Moreover, the program code may further include first control code configured to cause the CPU to make the UAV 1 start a flight toward the release place after the release place has been set. Moreover, the program code may further include instruction code configured to cause the CPU to instruct the user to perform sensing above the release candidate place before the release place is set in a case where it is determined that the release candidate place satisfies the one or more predetermined application conditions. Moreover, the acquisition code may cause the CPU to acquire the second sensing information obtained by sensing above the release candidate place with the optical sensor 23 in response to the operation of the user after the instruction is given to the user. Moreover, the program code may further include second determination code configured to cause the CPU to determine whether an obstacle has entered or will enter the release place on the basis of the third sensing information. Moreover, the program code may further include second control code configured to cause the CPU to make the UAV 1 stop descent at the release place in a case where it is determined that the obstacle has entered or will enter the release place. Moreover, the program code may further include processing code configured to cause the CPU to perform processing for calling attention at the release place in a case where it is determined that an obstacle has entered or will enter the release place. Moreover, the program code may further include reception code configured to cause the CPU to receive a transport request of the article designated by the user to the release place. Moreover, the program code may further include presentation code configured to cause the CPU to present to the user information of the article that has already been requested to be transported to a specific area including the release place before the user designates the article.

Figure 7B:
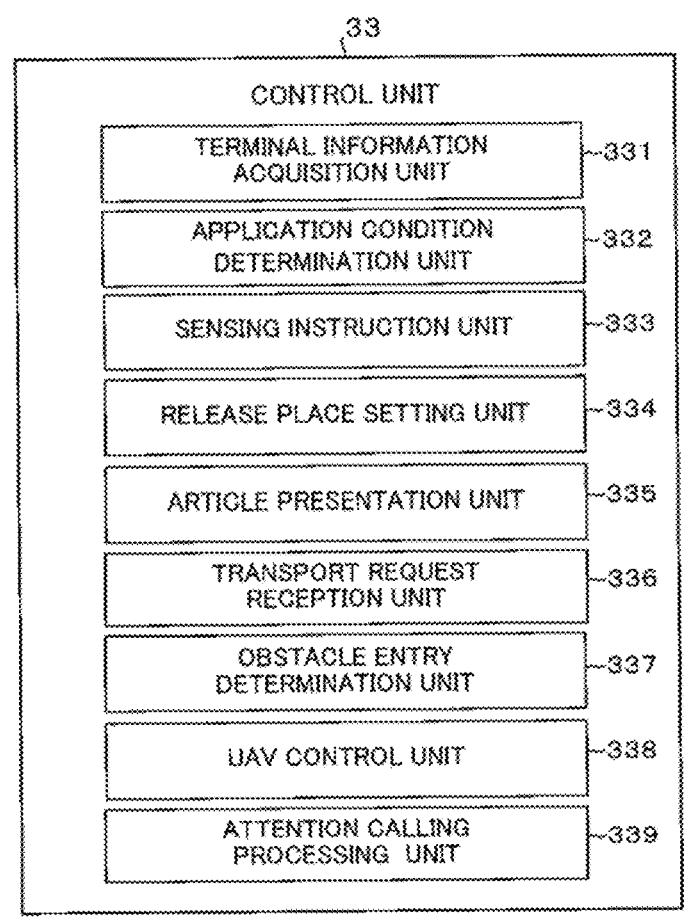
FIG. 7B is a diagram illustrating an example of a functional block in a control unit 33.

FIG. 7B is a diagram illustrating an example of a functional block in the control unit 33. For example, according to a program (program code group) stored in the ROM or the storage unit 32, as illustrated in FIG. 7B, the control unit 33 functions as a terminal information acquisition unit 331, an application condition determination unit 332, a sensing instruction unit 333, a release place setting unit 334, an article presentation unit 335, a transport request reception unit 336, an obstacle entry determination unit 337, a UAV control unit 338, an attention calling processing unit 339, and the like in accordance with the program code stored in, for example, the storage unit 32 or the memory.

The terminal information acquisition unit 331 acquires, from the user terminal 2 via the communication unit 31, the first sensing information obtained by sensing the peripheral area including the release candidate place existing around the user with the optical sensor 23 provided in the user terminal 2, and the position information of the user terminal 2. At this time, the terminal information acquisition unit 331 may acquire direction information indicating the direction of the optical sensor 23 at the time of sensing the first sensing information.

Moreover, before the release place is set by the release place setting unit 334, the terminal information acquisition unit 331 may acquire, from the user terminal 2 via the communication unit 31, the second sensing information obtained by sensing above the release candidate place with the optical sensor 23 provided in the user terminal 2. Furthermore, when the UAV 1 descends to release the article at the release place set by the release place setting unit 334, the terminal information acquisition unit 331 may acquire, from the user terminal 2 via the communication unit 31, the third sensing information obtained by sensing the peripheral area including the release place with the optical sensor 23 provided in the user terminal 2.

The application condition determination unit 332 determines whether the release candidate place satisfies the one or more application conditions on the basis of the first sensing information acquired by the terminal information acquisition unit 331. Here, the one or more application conditions is one or more conditions determined in advance as a place at which the article is able to be released. For example, the one or more application conditions is a condition that there is no obstacle in the release candidate place and that the release candidate place includes a ground area of a predetermined size or more. As a result, it is possible to set a highly safe release place for the UAV 1 to release the article. The obstacle here is not particularly limited, but is rubble, trees, or the like that hinders landing of the UAV 1 or arrangement of the article. Moreover, the predetermined size is, for example, a planar size (length ym×width xm) with which the UAV 1 is able to safely release the article (for example, the size sufficient for the UAV 1 to safely land), and may be a fixed value or a variable value. Such a size is set, for example, on the basis of the vehicle size of the UAV 1 in the operable state in the UAV management database 322. Moreover, the ground area is an area on the ground or a rooftop surface of a building.

In a case where a ground area having a predetermined size or more is unable to be extracted from the first sensing information, the application condition determination unit 332 determines that the release candidate place does not satisfy the one or more application conditions. Moreover, even in a case where a ground area having a predetermined size or more is able to be extracted from the first sensing information, when an obstacle is detected in the ground area, the application condition determination unit 332 determines that the release candidate place does not satisfy the one or more application conditions. Moreover, in a case where the first sensing information is obtained by sensing the release candidate place with the LiDAR sensor of the user terminal 2, because a shape including the unevenness in the release candidate place can be identified (recognized), an application condition is set that at least there is no obstacle and a flat ground area of a predetermined size or more is included. As a result, it is possible to set a release place with higher safely for the UAV 1 to release the article.

Here, the flat ground area means that there is no unevenness on the ground or the rooftop surface of the building, or even if there is unevenness, the unevenness is equal to or less than a threshold value. In this case, in a case where a flat ground area of a predetermined size or more is unable to be extracted from the first sensing information, the application condition determination unit 332 determines that the release candidate place does not satisfy the one or more application conditions. Incidentally, the one or more application conditions may include a condition that the gradient of the ground area is equal to or less than a threshold value in addition to the above-described conditions.

In a case where the application condition determination unit 332 determines that the release candidate place satisfies the one or more application conditions, the sensing instruction unit 333 transmits sensing instruction information to the user terminal 2 via the communication unit 31 to display the guidance screen G2 before the release place is set by the release place setting unit 334, thereby instructing the user of the user terminal 2 to perform sensing above the release candidate place. As a result, it is possible to minimize the sensing above the release candidate place being wastefully performed.

Then, in a case where the terminal information acquisition unit 331 acquires the second sensing information after the user is instructed to perform sensing above the release candidate place (after the instruction is given to the user), the application condition determination unit 332 further determines whether there is an obstacle above the release candidate place on the basis of the second sensing information. As a result, it is possible to set a release place with higher safely for the UAV 1 to release the article. The obstacle here is not particularly limited, but is a tree, an electric wire, or the like that hinders descent of the UAV 1. In a case where an obstacle is detected above the release candidate place from the second sensing information, the application condition determination unit 332 determines that there is an obstacle above the release candidate place.

In a case where the application condition determination unit 332 determines that the release candidate place satisfies the one or more application conditions, the release place setting unit 334 sets a release place suitable for releasing the article from the UAV 1 on the basis of the release candidate place and the position information of the user terminal 2. Here, setting the release place means, for example, setting the planar size and position (latitude and longitude) of the release place. For example, the planar size of the release place is set from among the ground areas having no obstacle and a predetermined size or more in the release candidate place indicated by the first sensing information. The planar size of the release place may match the planar size of the release candidate place. The position of the release place may be a current position indicated by the position information of the user terminal 2. Since the UAV 1 descends while confirming safety and adjusting the position by sensing the lower side with the sensor unit 14, there is no particular problem even if the actual position of the release place slightly deviates from the position of the release place set by the release place setting unit 334.

However, in a case where the terminal information acquisition unit 331 acquires the position information and the like of the user terminal 2 and the direction information indicating the direction of the optical sensor 23 at the time of sensing the first sensing information, the release place setting unit 334 sets a release place suitable for releasing the article from the UAV 1 on the basis of the release candidate place, the position information of the user terminal 2, and the direction information. As a result, it is possible to set the release place more accurately. In this case, for example, the release place setting unit 334 identifies (calculates) a distance from the current position (that is, the sensing position) indicated in the position information of the user terminal 2 to the center position (position on the image) in the release place in the first sensing information (for example, an image), and sets the position (latitude and longitude) of the release place according to the distance and the direction (for example, azimuth) indicated in the direction information.

Moreover, in a case where the terminal information acquisition unit 331 acquires the second sensing information, the release place setting unit 334 sets the release place in a case where the application condition determination unit 332 determines that the release candidate place satisfies the one or more application conditions and the application condition determination unit 332 determines that there is no obstacle above the release candidate place. Incidentally, a condition that there is no obstacle above the release candidate place may be included in the one or more application conditions. In this case, the sensing instruction information is not required to be transmitted to the user terminal 2 by the sensing instruction unit 333.

In a case where the release place has been set by the release place setting unit 334, the article presentation unit 335 transmits the article list to the user terminal 2 via the communication unit 31 and displays an article designation screen including the article list, thereby presenting the article (information of the article) that is able to be transported to the user of the user terminal 2. At this time, the article presentation unit 335 may refer to the article transportation management database 321 and indicate the article that has already been requested to be transported to the specific area including the set release place. That is, the article is indicated in the article list. As a result, the user of the user terminal 2 can confirm the article that has already been requested to be transported to the specific area including the release place on the article designation screen. Then, the transport request reception unit 336 receives a transport request of the article designated by the user on the article designation screen (transport request to the release place) from the user terminal 2 via the communication unit 31. The article related to the transport request thus received are loaded into the UAV 1 in the operable state.

In a case where the third sensing information is acquired by the terminal information acquisition unit 331, the obstacle entry determination unit 337 determines whether an obstacle has entered or will enter the release place on the basis of the third sensing information. As a result, the article is able to be more safely released from the UAV 1. The obstacle here is not particularly limited, but is a moving person, animal, or the like that hinders release of the article by the UAV 1. Entry of an obstacle into the release place means that the obstacle is actually entering the release place, or that it is estimated that the obstacle will enter the release place from now on. In the latter case, for example, in a case where the obstacle entry determination unit 337 detects an obstacle moving toward the release place from the third sensing information, the obstacle entering determination unit determines that the obstacle has entered or will enter the release place.

Moreover, the obstacle entry determination unit 337 determines whether an obstacle has entered or will enter the release place by comparing images included in the first sensing information and the third sensing information. As a result, it is possible to accurately determine whether an obstacle has entered or will enter the release place. For example, in a case where an object detected in the image included in the third sensing information is unable to be detected in the image included in the first sensing information, the obstacle entry determination unit 337 recognizes the object as an obstacle, and determines whether the recognized obstacle has entered or will enter the release place.

The UAV control unit 338 causes the UAV 1 to start the flight toward the release place set by the release place setting unit 334. For example, the UAV control unit 338 transmits a flight start command including release place information indicating the planar size and position of the release place to the UAV 1 loaded with the article related to the transport request via the communication unit 31, thereby causing the UAV 1 to start the flight toward the release place. That is, after the release place has been set by the release place setting unit 334, the UAV 1 is caused to fly out from the departure point. As a result, it is possible to more efficiently set in advance a release place suitable for the UAV 1 to release the article.

Moreover, in a case where the obstacle entry determination unit 337 determines that an obstacle has entered or will enter the release place when the UAV 1 descends to release the article at the release place, the UAV control unit 338 transmits a descent stop command to the UAV 1 via the communication unit 31 to cause the UAV 1 to stop the descent at the release place. As a result, it is possible to enhance safety prior to the release of the article from the UAV 1.

In a case where the obstacle entry determination unit 337 determines that an obstacle has entered or will enter the release place when the UAV 1 descends to release the article at the release place, the attention calling processing unit 339 performs an attention calling processing for calling attention at the release place. As a result, it is possible to enhance safety prior to the release of the article from the UAV 1. For example, the attention calling processing unit 339 transmits a message for calling attention to the user terminal 2 via the communication unit 31 to output (display output or voice output) the message from the user terminal 2.

[2. Operation of Article Transportation System S]

Figure 8:
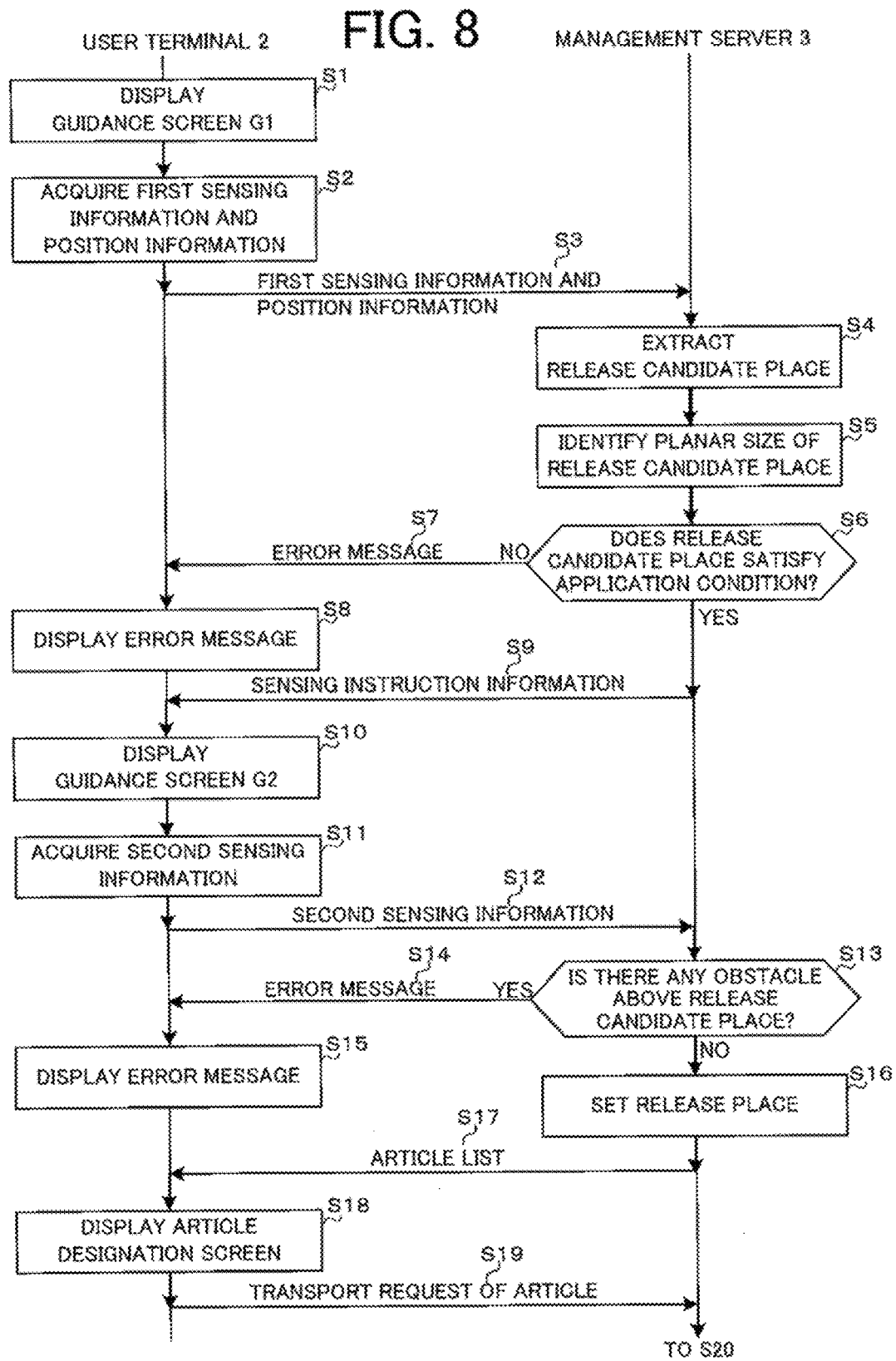
FIG. 8 is a sequence diagram illustrating an example of an operation of the article transportation system S when transportation of an article is performed.

Next, the operation of the article transportation system S will be described with reference to FIGS. 8 and 9. FIGS. 8 and 9 are sequence diagrams illustrating an example of the operation of the article transportation system S when transportation of the article is performed. As a premise of such an operation, it is assumed that the user terminal 2 accesses a site (a site providing a release place setting application) designated by a user's operation using a browser, and downloads and installs the release place setting application.

When the release place setting application is activated in response to the user's operation, as illustrated in FIG. 8, the control unit 26 of the user terminal 2 causes the operation/ display unit 21 to display the guidance screen G1 for sensing the peripheral area including the release candidate place existing around the user (step S1). Incidentally, a web page constituting the guidance screen G1 may be transmitted to the user terminal 2 by accessing the site designated by the user's operation with using a browser. In this case, since the web page is displayed by the browser, the release place setting application does not have to be downloaded.

Next, in response to the user's operation, the control unit 26 of the user terminal 2 causes the optical sensor 23 to sense the peripheral area including the release candidate place that falls within the sensing range of the optical sensor 23 (for example, falls within the guidance screen G1), acquires the first sensing information obtained by the sensing, and acquires position information indicating a position detected by the GPS receiver 22 at the sensing timing (step S2). Next, the control unit 26 transmits the first sensing information and the position information acquired in step S2 to the management server 3 via the communication unit 24 (step S3). Incidentally, upon acquiring the direction information indicating the direction of the optical sensor 23 at the time of sensing, the control unit 26 transmits the direction information together with the first sensing information and the position information to the management server 3 via the communication unit 24.

Next, when the first sensing information and the position information (or, the first sensing information, the position information, and the direction information) from the user terminal 2 are acquired (received) by the terminal information acquisition unit 331 via the communication unit 31, the control unit 33 of the management server 3 extracts the release candidate place from the first sensing information (step S4) and identifies the planar size of the release candidate place (step S5).

Next, the control unit 33 of the management server 3 determines whether the release candidate place extracted in step S4 satisfies the one or more application condition by the application conditions determination unit 332 on the basis of the first sensing information (step S6). For example, in a case where there is no obstacle in the extracted release candidate place and the release candidate place includes a ground area of a predetermined size or more, it is determined that the release candidate place satisfies one or more application conditions. Here, the predetermined size is set on the basis of the maximum vehicle size among the vehicle sizes of the UAVs 1 in the operable state. Then, in a case where it is determined that the release candidate place does not satisfy the one or more application conditions (step S6: NO), the processing proceeds to step S7. On the other hand, in a case where it is determined that the release candidate place satisfies the one or more application conditions (step S7: YES), the processing proceeds to step S9.

In step S7, the control unit 33 transmits an error message indicating that the release candidate place does not satisfy the one or more application conditions to the user terminal 2 via the communication unit 31. Such an error message includes, for example, a message of "There is no release candidate place having sufficient size for UAV 1 to land safely, so please rephotograph (reshoot)". When acquiring the error message from the management server 3 via the communication unit 24, the control unit 26 of the user terminal 2 displays the error message on the guidance screen G1 (step S8). As a result, the user of the user terminal 2 performs an operation for sensing another release candidate place having a certain size, for example. Incidentally, the error message may be output by voice from a speaker (the same applies hereinafter).

On the other hand, in step S9, the control unit 33 transmits sensing instruction information for instructing sensing above the release candidate place to the user terminal 2 via the communication unit 31. When acquiring the sensing instruction information from the management server 3 via the communication unit 24, the control unit 26 of the user terminal 2 causes the operation/display unit 21 to display the guidance screen G2 for sensing above the release candidate place (step S10). Instead of the sensing instruction information, a web page constituting the guidance screen G2 may be transmitted to the user terminal 2. In this case, the web page is displayed by the browser.

Next, in response to the user's operation, the control unit 26 of the user terminal 2 causes the optical sensor 23 to perform sensing above the release candidate place that falls within the sensing range of the optical sensor 23 (for example, falls within the guidance screen G2), acquires the second sensing information obtained by the sensing (step S11). Next, the control unit 26 transmits the second sensing information acquired in step S11 to the management server 3 via the communication unit 24 (step S12).

Next, when the control unit 33 of the management server 3 acquires the second sensing information from the user terminal 2 by the terminal information acquisition unit 331 via the communication unit 31, the application condition determination unit 332 determines whether there is an obstacle above the release candidate place on the basis of the second sensing information (step S13). In a case where it is determined that there is an obstacle above the release candidate place (step S13: YES), the processing proceeds to step S14. On the other hand, in a case where it is determined that there is no obstacle above the release candidate place (step S13: NO), the processing proceeds to step S16.

In step S14, the control unit 33 transmits an error message indicating that there is an obstacle above the release candidate place to the user terminal 2 via the communication unit 31. When acquiring the error message from the management server 3 via the communication unit 24, the control unit 26 of the user terminal 2 displays the error message on the guidance screen G2 (step S15). Such an error message includes, for example, a message "Obstacle is detected above the release candidate place, so please rephotograph (reshoot)". As a result, the user of the user terminal 2 performs an operation for sensing another release candidate place having no obstacle above, for example.

In step S16, the control unit 33 sets the release place by the release place setting unit 334 on the basis of the release candidate place and the position information of the user terminal 2 extracted in step S4. Next, the control unit 33 transmits an article list related to the transportable article to the user terminal 2 via the communication unit 31 (step S17). The article list may indicate the article that has already been requested to be transported to the specific area including the release place. When acquiring the article list from the management server 3 via the communication unit 24, the control unit 26 of the user terminal 2 causes the operation/display unit 21 to display the article designation screen on which the article list is posted (step S18). Next, in response to the operation of the user, the control unit 26 of the user terminal 2 transmits the transport request of the article designated by the user to the management server 3 via the communication unit 24 as described above (step S19). The transport request includes the article ID and the quantity of the article designated by the user.

Next, when the transport request from the user terminal 2 is received by the transport request reception unit 336 via the communication unit 31, the control unit 33 of the management server 3 selects the UAV 1 having the vehicle size smaller than the predetermined size indicated by the application condition determined in step S6 from among the UAVs 1 in the operable state as illustrated in FIG. 9 (step S20). Here, in a case where there is a plurality of UAVs 1 having a vehicle size smaller than the predetermined size indicated in the application condition, for example, the latest (newest) UAV 1 may be selected, or the UAV 1 having a low operation frequency may be selected. Alternatively, an appropriate UAV 1 may be selected according to at least one of the quantity, type, and size of the article indicated in the transport request.

Next, the control unit 33 of the management server 3 notifies the article indicated in the transport request to the mobile terminal of a staff at the departure point (the loading base of the article) of the UAV 1 selected in step S20 (step S21). The notification of the article may be performed by transmitting e-mail to the mail address of the staff, or may be performed by transmitting a message by SMS to the phone number of the staff. As a result, the article related to the transport request are loaded into the selected UAV 1.

Next, the control unit 33 of the management server 3 accesses the UAV 1 in accordance with the access information to the UAV 1 selected in step S20, and transmits a flight start command including the release place information indicating the planar size and position of the release place set in step S16 to the UAV 1 via the communication unit 31 by the UAV control unit 338 (step S22). Upon receiving the flight start command, the UAV 1 takes off from the departure point and starts the flight of the UAV 1 toward the release place, and sequentially transmits the position information and the vehicle ID of the UAV 1 to the management server 3.

Then, when the UAV 1 arrives at the release place, the UAV 1 waits in the sky for a predetermined time and then starts to descend to the release place to release the article. Until then, the control unit 33 determines whether the UAV 1 has arrived at the release place (step S23). In a case where it is determined that the UAV 1 has arrived at the release place (step S23: YES), the processing proceeds to step S24. Incidentally, when the UAV 1 reaches at the point immediately before arriving at the release place (minutes or tens of meters before), the processing may proceed to step S24.

In step S24, the control unit 33 transmits, to the user terminal 2 via the communication unit 31, sensing instruction information for instructing to sense the peripheral area including the release place when the UAV 1 descends to release the article at the release place set in step S16. When acquiring the sensing instruction information from the management server 3 via the communication unit 24, the control unit 26 of the user terminal 2 causes the operation/display unit 21 to display the guidance screen G3 for sensing the peripheral area including the release place (step S25). As illustrated in FIG. 6, the release place frame 73 corresponding to the planar size of the release place set in step S16 is displayed on the guidance screen G3. Incidentally, instead of the sensing instruction information, a web page constituting the guidance screen G3 may be transmitted to the user terminal 2. In this case, the web page is displayed by the browser.

Next, in response to the user's operation, as described above, when the UAV 1 descends to the release place, the control unit 26 of the user terminal 2 causes the optical sensor 23 to perform sensing continuously the peripheral area including the release place that falls within the sensing range of the optical sensor 23 (for example, falls within the guidance screen G3), and acquires the third sensing information obtained by the sensing (step S26). Next, the control unit 26 continuously transmits the third sensing information acquired in step S26 to the management server 3 via the communication unit 24 (step S27).

Next, when the control unit 33 of the management server 3 acquires the third sensing information (for example, successive images) continuously transmitted from the user terminal 2 by the terminal information acquisition unit 331 via the communication unit 31, the obstacle entry determination unit 337 determines whether an obstacle has entered or will enter the release place on the basis of the third sensing information (step S28). In a case where it is determined that the obstacle has entered or will enter the release place (step S28: YES), the processing proceeds to step S29. On the other hand, in a case where it is determined that no obstacle has entered or will enter the release place (step S28: NO), the processing proceeds to step S32.

Incidentally, the determination in step S28 is repeatedly performed until the release of the article is completed on the basis of the third sensing information acquired in time series. Moreover, in this determination, for example, even in a case where the sensing range (that is, the sensing range set at the start of sensing) of the optical sensor 23 fluctuates by a predetermined distance or more (for example, the release place comes out of the guidance screen G3), it may be determined that an obstacle has entered or will enter the release place.

In step S29, the control unit 33 causes the UAV control unit 338 to transmit the descent stop command to the UAV 1 via the communication unit 31. The UAV 1 that has received the descent stop command maintains the state as it is immediately before the descent, and stops the descent if the descent is in progress. Next, the control unit 33 causes the attention calling processing unit 339 to transmit the message for calling attention to the user terminal 2 via the communication unit 31 (step S30), and advances the processing to step S32. When acquiring the message for calling attention from the management server 3 via the communication unit 24, the control unit 26 of the user terminal 2 outputs (display output or voice output) the message (step S31).

In step S32, the control unit 33 determines whether the release of the article by the UAV 1 has been completed. The information indicating the release completion of the article is transmitted from the UAV 1 to the management server 3. In a case where it is determined that the release of the article by the UAV 1 has not been completed (step S32: NO), the processing returns to step S28 to acquire the third sensing information, and it is determined whether an obstacle has entered or will enter the release place. On the other hand, in a case where it is determined that the release of the article by the UAV 1 has been completed (step S32: YES), the control unit 33 transmits a return command to the departure point to the UAV 1 via the communication unit 31 (step S33). The UAV 1 that has received the return command returns toward the departure point.

As described above, according to the above embodiment, the management server 3 acquires the first sensing information obtained by sensing the peripheral area including the release candidate place existing around the user with the optical sensor 23 of the user terminal 2 and the position information of the user terminal 2, determines whether the release candidate place satisfies the one or more application conditions on the basis of the first sensing information, and in a case where it is determined that the release candidate place satisfies the one or more application conditions, sets the release place suitable for releasing the article from the UAV 1 on the basis of the release candidate place and the position information of the user terminal 2. Therefore, it is possible to more efficiently set the release place suitable for releasing the article by the UAV 1. Moreover, the release place can be easily and accurately searched for as compared with the method of searching for the release place by using the UAV 1. In particular, according to the configuration that causes the UAV 1 to start the flight toward the release place after the release place has been set, the release place suitable for the UAV 1 to release the article is able to be set in advance before the UAV 1 takes off. Therefore, the search cost can be reduced as compared with the method of searching for the release place using the UAV 1.

Incidentally, the above-described embodiment is one embodiment of the present invention, and the present invention is not limited to the above-described embodiment, changes from the above-described embodiment can be made on various configurations and the like within a scope not departing from the gist of the present invention, and such cases shall be also included in the technical scope of the present invention. In the above embodiment, while it is configured such that the UAV 1 starts the flight toward the release place after the release place suitable for releasing the article has been set, it may be configured such that the release place suitable for releasing the article is set after the UAV 1 carrying the predetermined article starts the flight toward the specific area. Moreover, in the above embodiment, while the UAV has been described as an example of the unmanned aerial vehicle, the present invention is also applicable to a flying robot as the unmanned aerial vehicle.

Moreover, in the above embodiment, while it is configured that the management server 3 determines whether the release candidate place satisfies the one or more application conditions and sets a release place suitable for releasing the article from the UAV 1, this may be performed by the user terminal 2. That is, it may be configured such that the user terminal 2 determines whether the release candidate place satisfies the above-described application conditions on the basis of the first sensing information obtained by sensing the peripheral area including the release candidate place existing around the user with the optical sensor 23 according to the release place setting application, and in a case where it is determined that the release candidate place satisfies the one or more application conditions, sets the release place suitable for releasing the article from the UAV 1 on the basis of the release candidate place and the position information of the user terminal 2. In this case, the user terminal 2 transmits release place information indicating the planar size and the position of the set release place to the management server 3 via the communication unit 24. Then, the management server 3 selects the UAV 1 on the basis of the release place information from the user terminal 2, and transmits a flight start command including the release place information to the selected UAV 1. Incidentally, similarly to the above embodiment, the user terminal 2 may set the release place on the basis of the release candidate place, the position information of the user terminal 2, and the direction information indicating the direction of the optical sensor 23 at the time of sensing.

Furthermore, similarly to the above embodiment, the user terminal 2 may further determine, before the release place is set, whether there is an obstacle above the release candidate place on the basis of the second sensing information obtained by sensing above the release candidate place with the optical sensor 23, and in a case where it is determined that there is no obstacle above the release candidate place, may set the release place. In this case, similarly to the above embodiment, the user terminal 2 may instruct the user to perform sensing above the release candidate place, and then acquire the second sensing information obtained by sensing above the release candidate place with the optical sensor 23. Furthermore, similarly to the above embodiment, the user terminal 2 may determine whether an obstacle has entered or will enter the release place on the basis of the third sensing information obtained by sensing the peripheral area including the release place with the optical sensor 23 when the UAV 1 descends to release the article at the set release place. Then, in a case where it is determined that the obstacle has entered or will enter the release place, the user terminal 2 performs processing for calling attention in the release place.

REFERENCE SIGNS LIST

S Article transportation system
1 UAV
2 User terminal
3 Management server
11 Drive unit
12 Positioning unit
13 Communication unit
14 Sensor unit
15 Storage unit
16 Control unit
21 Operation/display unit
22 GPS receiver
23 Optical sensor
24 Communication unit
25 Storage unit
26 Control unit
31 Communication unit
32 Storage unit
33 Control unit
331 Terminal information acquisition unit
332 Application condition determination unit
333 Sensing instruction unit
334 Release place setting unit
335 Article presentation unit
336 Transport request reception unit
337 Obstacle entry determination unit
338 UAV control unit
339 Attention calling processing unit

What is claimed is:

1. An information processing system, comprising:
at least one memory configured to store program code; and
at least one processor configured to access the program code and operate as instructed by the program code, the program code including:
acquisition code configured to cause the at least one processor to acquire, together with position information of a terminal of a user on a ground, first sensing information obtained by sensing a peripheral area around the user including a release candidate place at which an article to be transported by an unmanned aerial vehicle is to be released, and direction information indicating a direction of the sensor at the time of the sensing, wherein the sensing is performed by an optical sensor provided in the terminal, and the sensing includes detecting obstacles at ground level in the release candidate place;
first determination code configured to cause the at least one processor to determine whether the release candidate place satisfies one or more predetermined application conditions as a place at which the article is able to be released on the basis of the first sensing information, wherein the one or more predetermined application conditions include conditions related to obstacles at ground level in the release candidate place;

instruction code configured to cause the at least one processor to instruct the user to perform an additional sensing operation before the release place is set, in a case where it is determined that the release candidate place satisfies the one or more application conditions, wherein the acquisition code is further configured to cause the at least one processor to acquire additional sensing information obtained by the additional sensing operation with the sensor in response to the operation of the user after the instruction is given to the user;

setting code configured to cause the at least one processor to set a release place suitable for releasing the article from the unmanned aerial vehicle on the basis of the release candidate place, the position information of the terminal, and the direction information in a case where it is determined that the release candidate place satisfies the one or more application conditions;

first control code configured to cause the at least one processor to make the unmanned aerial vehicle start a flight toward the release place after the release place has been set.

2. The information processing system according to claim 1, wherein the one or more application conditions comprise that there is no obstacle in the release candidate place and that the release candidate place has a ground area of a predetermined size or more.

3. The information processing system according to claim 1, wherein the one or more application conditions comprise that there is no obstacle in the release candidate place and that the release candidate place has a flat ground area of a predetermined size or more.

4. The information processing system according to claim 1, wherein the additional sensing information is second sensing information, the acquisition code causes the at least one processor to further acquire, before the release place is set and in response to an operation of the user, the second sensing information obtained by the sensor sensing above the release candidate place, the first determination code causes the at least one processor to further determine whether there is an obstacle above the release candidate place on the basis of the second sensing information, and the setting code causes the at least one processor to set the release place in a case where it is determined that there is no obstacle above the release candidate place.

5. The information processing system according to claim 1, wherein the acquisition code causes the at least one processor to further acquire third sensing information obtained by sensing a peripheral area including the release place with the sensor when the unmanned aerial vehicle descends to release the article at the release place, and the program code further includes second determination code configured to cause the at least one processor to determine whether an obstacle has entered or will enter the release place on the basis of the third sensing information.

6. The information processing system according to claim 5, wherein the second determination code causes the at least one processor to determine whether the obstacle has entered or will enter the release place by comparing images included in the first sensing information and the third sensing information.

7. The information processing system according to claim 5, the program code further including second control code configured to cause the at least one processor to make the unmanned aerial vehicle stop descent at the release place in a case where it is determined that the obstacle has entered or will enter the release place.

8. The information processing system according to claim 5, the program code further including processing code configured to cause the at least one processor to perform processing for issuing an alert at the release place in a case where it is determined that an obstacle has entered or will enter the release place.

9. The information processing system according to claim 1, the program code further including reception code configured to cause the at least one processor to receive a request to transport the article to the release place, the article being designated by the user.

10. The information processing system according to claim 9, the program code further including presentation code configured to cause the at least one processor to present to the user, before the user designates the article, information of an article that has already been requested to be transported to a specific area including the release place.

11. The information processing system according to claim 1, wherein the acquisition code causes the at least one processor to acquire direction information indicating a direction of the sensor at the time of the sensing, and the setting code causes the at least one processor to set the release place on the basis of the release candidate place, position information of the terminal, and the direction information.

12. A method for setting release place to be executed by one or more computers, the method comprising:

acquiring, together with position information of a terminal of a user on a ground, first sensing information obtained by sensing a peripheral area around the user including a release candidate place at which an article to be transported by an unmanned aerial vehicle is to be released, and direction information indicating a direction of the sensor at the time of the sensing, wherein the sensing is performed by an optical sensor provided in the terminal, and the sensing includes detecting obstacles at ground level in the release candidate place;

determining whether the release candidate place satisfies one or more predetermined application conditions as a place at which the article is able to be released on the basis of the first sensing information, wherein the one or more predetermined application conditions include conditions related to obstacles at ground level in the release candidate place;

instructing the user to perform an additional sensing operation before the release place is set, in a case where it is determined that the release candidate place satisfies the one or more application conditions, acquiring additional sensing information obtained by the additional sensing operation with the sensor in response to the operation of the user after the instruction is given to the user;

setting a release place suitable for releasing the article from the unmanned aerial vehicle on the basis of the release candidate place, the position information of the terminal, and the direction information in a case where it is determined that the release candidate place satisfies the one or more application conditions; and making the unmanned aerial vehicle start a flight toward the release place after the release place has been set.

13. A non-transitory computer readable memory having stored thereon a program configured to cause a computer included in a terminal of a user on a ground to:

acquire, together with position information of the terminal, first sensing information obtained by sensing a peripheral area around the user including a release candidate place at which an article to be transported by an unmanned aerial vehicle is to be released, and direction information indicating a direction of the sensor at the time of the sensing, wherein the sensing is performed by an optical sensor provided in the terminal, and the sensing includes detecting obstacles at ground level in the release candidate place;

determine whether the release candidate place satisfies one or more predetermined application conditions as a place at which the article is able to be released on the basis of the first sensing information, wherein the one or more predetermined application conditions include conditions related to obstacles at ground level in the release candidate place;

instruct the user to perform an additional sensing operation before the release place is set, in a case where it is determined that the release candidate place satisfies the one or more application conditions, acquire additional sensing information obtained by the additional sensing operation with the sensor in response to the operation of the user after the instruction is given to the user;

set a release place suitable for releasing the article from the unmanned aerial vehicle on the basis of the release candidate place, the position information of the terminal, and the direction information in a case where it is determined that the release candidate place satisfies the one or more application conditions; and make the unmanned aerial vehicle start a flight toward the release place after the release place has been set.

\* \* \* \* \*